C. M. FINSTAD.
COMPASSES.
APPLICATION FILED MAY 29, 1918.

1,296,377.

Patented Mar. 4, 1919.

Inventor
Christian M. Finstad
By Victor J. Evans
Attorney

UNITED STATES PATENT OFFICE.

CHRISTIAN M. FINSTAD, OF BROOKLYN, NEW YORK.

COMPASSES.

1,296,377.     Specification of Letters Patent.     Patented Mar. 4, 1919.

Application filed May 29, 1918. Serial No. 237,271.

*To all whom it may concern:*

Be it known that I, CHRISTIAN M. FINSTAD, residing at Brooklyn, in the county of Kings and State of New York, have invented new and useful Improvements in Compasses, of which the following is a specification.

This invention relates to drafting instruments and particularly to compasses and has for its principal object the provision of a scale bearing beam provided with relatively separable sides for the reception therebetween of a scribing element, and means for permitting said element to be conveniently and quickly shifted to any point in the length of the scale surface and then held in a relatively fixed position for use.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1:
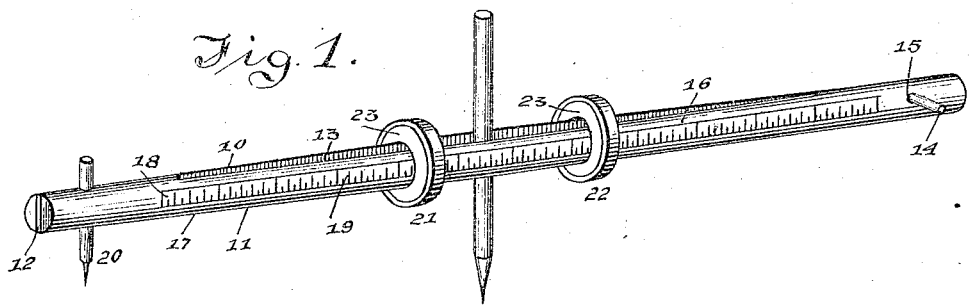
Figure 1 is a perspective view of the instrument.
Figure 2:
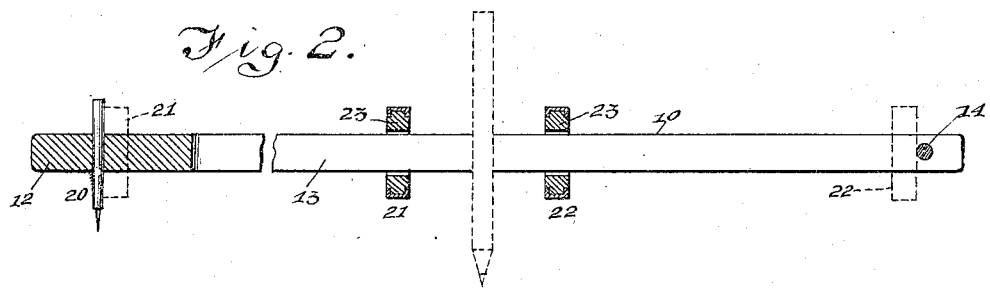
Fig. 2 is a longitudinal section therethrough.
Figure 3:
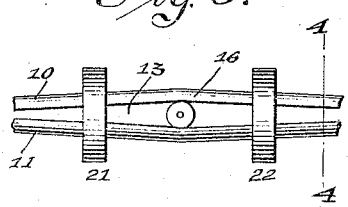
Fig. 3 is a plan view of a portion of the instrument showing the position of the parts to clamp the scribing element.
Figure 4:
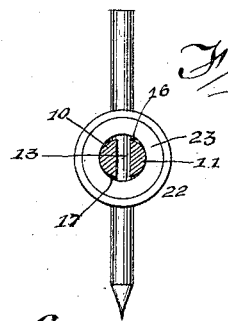
Fig. 4 is a section on line 4—4 of Fig. 3.

The invention comprises a pair of parallel strips 10 and 11 which are substantially of identical construction. Between the strips is secured a thin spacing strip 12, the same being extended through a suitable portion of the length of the instrument so that beyond the strip and for the remainder of the length of the instrument there is a continuous slot 13 formed which is arranged to receive an ordinary pencil or a suitable scribing instrument. At the opposite end the strips 10 and 11 are operatively related to one another by means of a guide pin 14, the same being preferably fixedly connected in any suitable well-known manner to one of the strips, while as illustrated it is free to pass through an aperture 15 in the mating strip. I prefer this arrangement in order that a relatively wide separation of the two strips can be obtained throughout the length of the instrument.

The strip 11 is provided with curved surfaces 16 and 17 and a flat surface 18 and on the latter is arranged suitable graduations 19, the same starting from a fulcrum post 20 and ending preferably at the guide stem 14.

The strips 10 and 11 can be constructed of any suitable well-known material such as wood, metal or the like and when constructed of the former, I perfer to provide relatively adjustable clamping rings 21 and 22. Each of these rings is provided with an inner body of relatively pliable material 23, such as leather which is adapted to be canted or flexed slightly when the rings are brought into clamping engagement with the beam so that when the pencil or marking device is interposed between the strips 10 and 11 an effective impingement of the strips against the pencil can be positively set up.

When it is desired to use the instrument to draw curves of a given radii the pencil or marking device is inserted in the slot 13 between the strips 10 and 11 and at a point between the clamping rings 21 and 22 and adjusted with reference to the scale surface 10 to suit given requirements. After the marking device has been properly set the rings 21 and 22 are manually advanced toward each other. Incident to the formation of the strips 16 and 17 they are flexible to a certain degree and the arranging of the marking device or pencil between the strips and the advancing of the rings toward one another taxes the flexiblity of the strips and an extremely affected clamping action is brought about. At the same time by merely separating the rings from each other, the marking device or pencil can be re-adjusted at the convenience of the user. The rings 21 and 22 are relatively narrow so as to not materially interfere with the visibility of the scale surface. The flexible leather body of each ring is preferably bound by a metallic shell 24.

Figure 5:
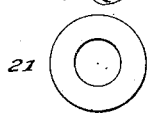
Fig. 5 is an end view of a slightly modified form of the clamping ring.

When the beam is constructed entirely of metal the clamping rings may be also formed of metal according to the design illustrated in Fig. 5. Each of the rings 21 and 22 has an internal diameter which exceeds the normal diameter of the beam so as to permit the mating strips 10 and 11 to be operatively separated as the occasion necessitates. The pin 14 at one end and the fulcrum post at the opposite end of the beam constitutes stops to prevent accidental separation of the mentioned rings 21 and 22 from the beam.

Figure 6:
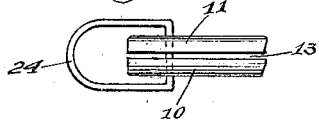
Fig. 6 is a plan view of a portion of the instrument showing a slightly modified form thereof.

In the form of the invention shown in Fig. 6, I substitute a bail 24 for the guide pin 14 in order that the device may be hung from a suitable support when not in use.

What is claimed as new is:—

1. A compass comprising a beam provided with a longitudinal slot adapted to receive a marker therein, a fulcrum post at one end of the beam, and a plurality of clamping devices freely slidable over the beam and adapted to advance the walls of the slot into clamping engagement with the marker.

2. A compass comprising a beam consisting of substantially indentical strips, a spacer located at one end of the beam and secured between the strips so that the sides of the beam beyond the spacer are free for relative adjustment, a pin passing through the opposite end of the beam, a fulcrum post extending through the first end of the beam, and clamping means slidable on the beam between the pin and said fulcrum post.

3. A compass comprising a longitudinally slotted beam, a fulcrum post at one end of the beam and a plurality of ring like clamps slidable on the beam and co-acting with the same to permit of the clamping of a marker between the walls of the slot of the beam, each of said rings having a relatively flexible inner body arranged for effective contact with the walls of the beam.

In testimony whereof I affix my signature.

CHRISTIAN M. FINSTAD.

Copies of this patent may be obtained for five cents each, by addressing the "Commissioner of Patents, Washington, D. C."